US005584562A

United States Patent [19]

Geran

[11] Patent Number: 5,584,562
[45] Date of Patent: Dec. 17, 1996

[54] BICYCLE WHEEL WITH BATTERY POWERED SAFETY LIGHTS

[76] Inventor: Michael R. Geran, 56 Johnson Ave., Matawn, N.J. 07747

[21] Appl. No.: 523,770

[22] Filed: Sep. 5, 1995

[51] Int. Cl.⁶ ............................................. B62J 6/00
[52] U.S. Cl. ................................... 362/72; 362/78
[58] Field of Search ............................ 362/72, 78, 184, 362/253

[56] References Cited

U.S. PATENT DOCUMENTS

| | | | |
|---|---|---|---|
| 3,987,409 | 10/1976 | Freeman | 362/72 |
| 4,135,229 | 1/1979 | Modurkay | 362/78 |
| 4,225,848 | 9/1980 | Roberts | 362/72 |
| 4,381,537 | 4/1983 | Hinrichs | 362/78 |
| 4,725,928 | 2/1988 | Strepek | 362/78 |
| 4,796,972 | 1/1989 | Thomas et al. | 362/72 |
| 4,800,469 | 1/1989 | Leon | 362/72 |
| 5,121,305 | 6/1992 | Deed et al. | 362/72 |
| 5,333,101 | 7/1994 | McEvoy | 362/72 |
| 5,418,697 | 5/1995 | Chiou | 362/72 |

Primary Examiner—Stephen F. Husar
Assistant Examiner—Sara Sachie Raab

[57] ABSTRACT

A bicycle wheel with battery powered safety lights adapted for use in association with a bicycle having a fork with two free ends, the apparatus comprising: a rim formed in a cylindrical configuration with an inner surface and an outer surface, the outer surface including two end edges with ledges extending radially outward therefrom; and a hub formed in a cylindrical configuration and positioned centrally within the rim, an axle extending through the axis of the hub, the axle having two ends each being rotatably couplable to a free end of a bicycle fork, a plurality of spokes extending radially from the hub and being affixed to the inner surface of the rim, the spokes having sidewalls with a plurality of light bulbs positioned therethrough, a first sidewall of the hub including a switch and a hinged door to permit access to a battery compartment, the battery compartment being operatively coupled to the switch and light bulbs, in an operative orientation the lights bulbs being illuminated to provide enhanced visibility of a bicycle.

5 Claims, 3 Drawing Sheets

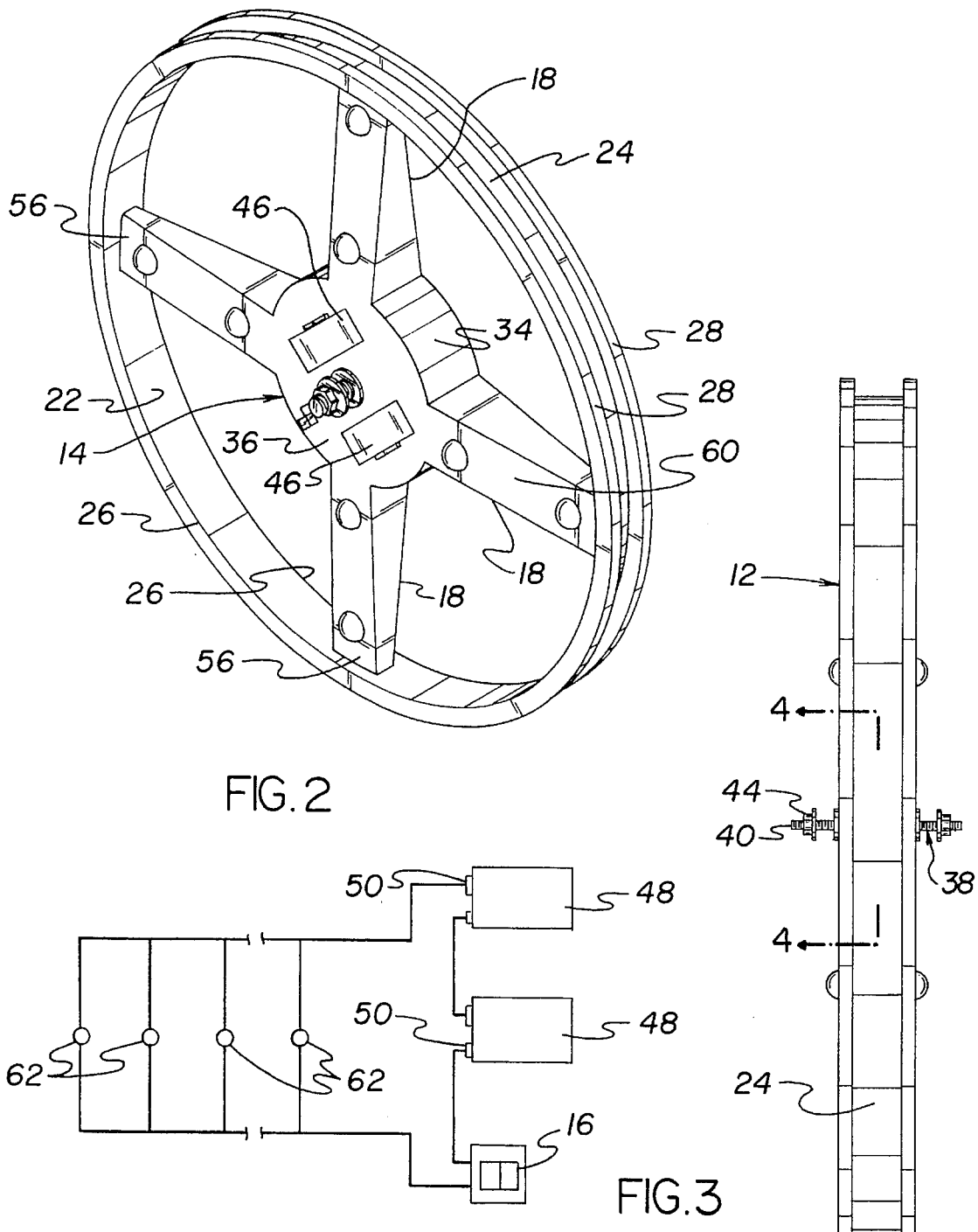

5,584,562

BICYCLE WHEEL WITH BATTERY POWERED SAFETY LIGHTS

BACKGROUND OF THE INVENTION

1. Field of the Invention

The present invention relates to a bicycle wheel with battery powered safety lights and more particularly pertains to illuminating bicycles to provide ample visibility to approaching vehicles.

2. Description of the Prior Art

The use of wheel mountable vehicle lights is known in the prior art. More specifically, wheel mountable vehicle lights heretofore devised and utilized for the purpose of lighting the wheels of various types of vehicles are known to consist basically of familiar, expected, and obvious structural configurations, notwithstanding the myriad of designs encompassed by the crowded prior art which has been developed for the fulfillment of countless objectives and requirements.

By way of example, the prior art discloses in U.S. Pat. No. 5,333,101 to McEvoy a bicycle light.

U.S. Pat. No. 5,121,305 to Deed discloses a wheel light.

U.S. Pat. No. 4,800,469 to Leon discloses a wheel mounted safety light.

U.S. Pat. No. 4,725,928 to Strepek discloses a self-contained lighting assembly for vehicle wheel.

U.S. Pat. No. 4,135,229 to Modurkay discloses a safety device for use on a bicycle wheel.

Lastly, U.S. Pat. No. 4,225,848 to Roberts discloses an electric lighting system for bicycle wheels.

In this respect, the bicycle wheel with battery powered safety lights according to the present invention substantially departs from the conventional concepts and designs of the prior art, and in doing so provides an apparatus primarily developed for the purpose of illuminating bicycles to provide ample visibility to approaching vehicles.

Therefore, it can be appreciated that there exists a continuing need for a new and improved bicycle wheel with battery powered safety lights which can be used for illuminating bicycles to provide ample visibility to approaching vehicles. In this regard, the present invention substantially fulfills this need.

SUMMARY OF THE INVENTION

In view of the foregoing disadvantages inherent in the known types of wheel mountable vehicle lights now present in the prior art, the present invention provides an improved bicycle wheel with battery powered safety lights. As such, the general purpose of the present invention, which will be described subsequently in greater detail, is to provide a new and improved bicycle wheel with battery powered safety lights and method which has all the advantages of the prior art and none of the disadvantages.

To attain this, the present invention essentially comprises a new and improved bicycle wheel with battery powered safety lights adapted for use in association with a bicycle having a fork with two free ends, each free end including a semicircular slot, the apparatus comprising, in combination: a rim formed in a cylindrical configuration with two open ends and a perimeter, the perimeter of the rim having an inner surface and an outer surface, the outer surface of the perimeter of the rim including two end edges with ledges extending radially outward therefrom, an inflatable bicycle tire being positioned around the outer surface of the perimeter of the rim between the ledges; a hub formed in a generally cylindrical configuration and having an essentially hollow interior, the hub having a rounded outer wall and two planar circular side walls, the hub being positioned centrally within the rim with its rounded outer wall facing the inner surface of the rim, the axis of the hub including an aperture extending therethrough, an axle with two free ends extending through the aperture in the hub, each free end extending beyond an adjacent sidewall of the hub and including external screw threads, two washer assemblies each comprising inboard and outboard washers separated by a central member, each washer assembly being threadedly coupled to a free end of the axle whereby each inboard washer abuts a side wall of the hub, each central member adapted to receive the semicircular slot of a bicycle fork thereby permitting circular rotation thereabout; a first sidewall of the hub including a switch and two hinged doors to permit access within its interior, a battery compartment being positioned adjacent to each door, each battery compartment including battery terminal coupling devices, a plurality of electrically conductive wires operatively coupling each of the battery coupling devices to the switch, the switch being slidable to an on orientation allowing the flow of electrical current therethrough, the switch being slidable to an off orientation prohibiting the flow of electrical current therethrough; and four equidistantly spaced spokes extending radially from the hub, each spoke having an outboard end affixed to the inner surface of the rim, each spoke having sidewalls formed contiguously with the sidewalls of the hub, the distance between the sidewalls of each spoke being greater adjacent to the hub than at its outboard end, a light bulb being positioned through each sidewall of each rim adjacent to the hub and outboard end of each spoke, a generally semispherical shaped light bulb cover being coupled around each light bulb, a plurality of electrically conductive wires operatively coupling each light bulb to the switch and battery terminal coupling devices, in an operative orientation the lights bulbs being illuminated to provide enhanced visibility of a bicycle.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved bicycle wheel with battery powered safety lights which has all of the advantages of the prior art wheel mountable vehicle lights and none of the disadvantages.

It is another object of the present invention to provide a new and improved bicycle wheel with battery powered safety lights which may be easily and efficiently manufactured and marketed.

It is further object of the present invention to provide a new and improved bicycle wheel with battery powered safety lights which is of durable and reliable constructions.

An even further object of the present invention is to provide a new and improved bicycle wheel with battery powered safety lights which is susceptible of a low cost of manufacture with regard to both materials and labor, and which accordingly is then susceptible of low prices of sale to the consuming public, thereby making such bicycle wheel with battery powered safety lights economically available to the buying public.

Still yet another object of the present invention is to provide a new and improved bicycle wheel with battery powered safety lights which provides in the apparatuses and methods of the prior art some of the advantages thereof, while simultaneously overcoming some of the disadvantages normally associated therewith.

Still another object of the present invention is to illuminating bicycles to provide ample visibility to approaching vehicles.

Lastly, it is an object of the present invention to provide a new and improved bicycle wheel with battery powered safety lights adapted for use in association with a bicycle having a fork with two free ends, the apparatus comprising: a rim formed in a cylindrical configuration with an inner surface and an outer surface, the outer surface including two end edges with ledges extending radially outward therefrom; and a hub formed in a cylindrical configuration and positioned centrally within the rim, an axle extending through the axis of the hub, the axle having two ends each being rotatably couplable to a free end of a bicycle fork, a plurality of spokes extending radially from the hub and being affixed to the inner surface of the rim, the spokes having sidewalls with a plurality of light bulbs positioned therethrough, a first sidewall of the hub including a switch and a hinged door to permit access to a battery compartment, the battery compartment being operatively coupled to the switch and light bulbs, in an operative orientation the lights bulbs being illuminated to provide enhanced visibility of a bicycle.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is an isolated perspective view of the rim, spokes and hub of the apparatus.

FIG. 3 is a side perspective view of the rim of the apparatus.

FIG. 7 is a schematic diagram of the switch, batteries and lights connection.

The same reference numerals refer to the same parts through the various Figures.

DESCRIPTION OF THE PREFERRED EMBODIMENT

Figure 1:
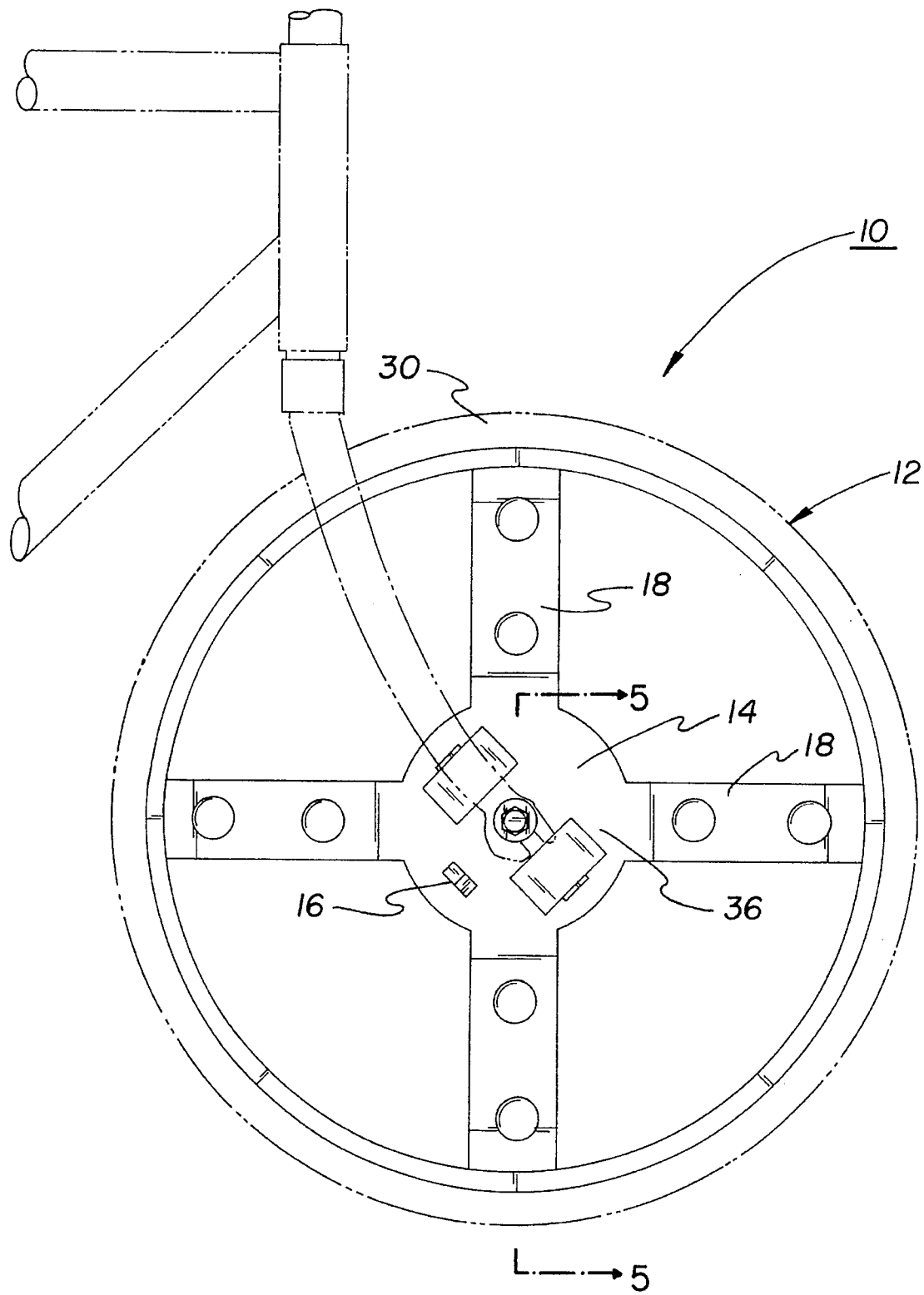
FIG. 1 is a perspective view of the preferred embodiment of the bicycle wheel with battery powered safety lights constructed in accordance with the principles of the present invention.

With reference now to the drawings, and in particular to FIG. 1 thereof, the preferred embodiment of the new and improved bicycle wheel with battery powered safety lights embodying the principles and concepts of the present invention and generally designated by the reference numeral 10 will be described.

The bicycle wheel with battery powered safety lights 10 is adapted for use in association with a bicycle having a fork with two free ends. On a conventional bicycle each free end of the fork includes a semicircular slot to permit rotatable coupling to the axle of the apparatus. The present invention is comprised of a plurality of components. Such components in their broadest context include a rim 12, a hub 14, a switch 16 and four spokes 18. Such components are individually configured and correlated with respect to each other so as to attain the desired objective.

More specifically, the rim 12 is formed in a cylindrical configuration with two open ends and a perimeter. The rim is manufactured in a plurality of different diameters and widths to accommodate a wide variety of bicycle configurations. The perimeter of the rim 12 has an inner surface 22 and an outer surface 24. The outer surface of the perimeter of the rim 12 includes two end edges 26 with ledges 28 extending radially outward from its edges. An inflatable bicycle tire 30 is positioned around the outer surface of the perimeter of the rim 12 between the ledges 28. The ledges assist in securely retaining the bicycle tire on the rim. In alternative embodiments of the apparatus a solid rubber tire is positioned around the rim. Note FIGS. 1 and 2.

Figure 4:
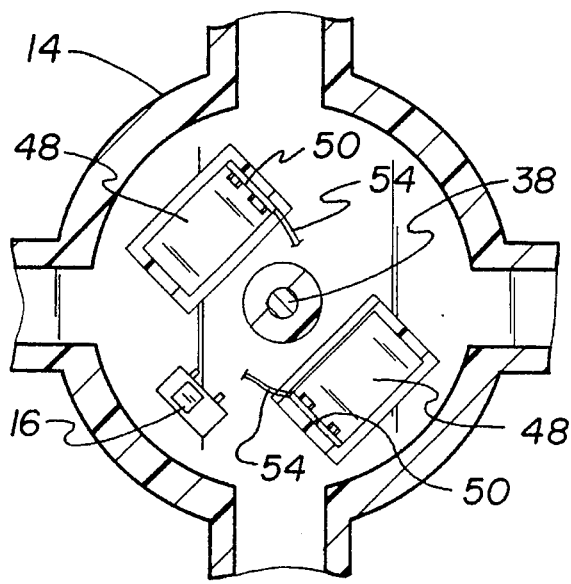
FIG. 4 is a cross sectional view of the hub taken along section line 4—4 of FIG. 3.

A hub 14 is formed in a generally cylindrical configuration and has an essentially hollow interior. The hub 14 has a rounded outer wall 34 and two planar circular side walls 36. The hub 14 is positioned centrally within the rim 12 with its rounded outer wall facing the inner surface of the rim 12. The plane of the sidewalls are positioned parallel to the ledges of the rim. The axis of the hub 14 includes an aperture extending through it. Note FIGS. 2 and 4.

An axle 38 with two free ends 40 extends through the aperture in the hub 14. The central portion of the axle is positioned inside the hub and permits rotation of the hub thereabout. Each free end extends beyond an adjacent sidewall of the hub 14 and includes external screw threads. Two washer assemblies 44 each comprise inboard and outboard washers separated by a cylindrical central member. Each washer assembly is threadedly coupled to a free end of the axle whereby each inboard washer abuts a side wall of the hub 14. The threaded coupling method maintains the washer assembly in stabile position. Each central member is adapted to receive the semicircular slot of a bicycle fork thereby permitting circular rotation about the central member. Note FIGS. 2 and 5.

A first sidewall 36 of the hub 14 includes a generally rectangular shaped switch 16. The first sidewall also includes two hinged doors 46 to permit access within its interior. A battery compartment 48 is positioned adjacent to each door. Each battery compartment includes battery terminal coupling devices 50. In the preferred embodiment the battery terminal coupling devices 50 utilized are adapted to be coupled to conventional nine volt batteries. A plurality of electrically conductive wires 54 operatively couple each of the battery terminal coupling devices to the switch 16. The switch is slidable to an on orientation allowing the flow of electrical current through it. The switch is slidable to an off orientation prohibiting the flow of electrical current through it. Note FIGS. 4 and 7.

Figure 5:
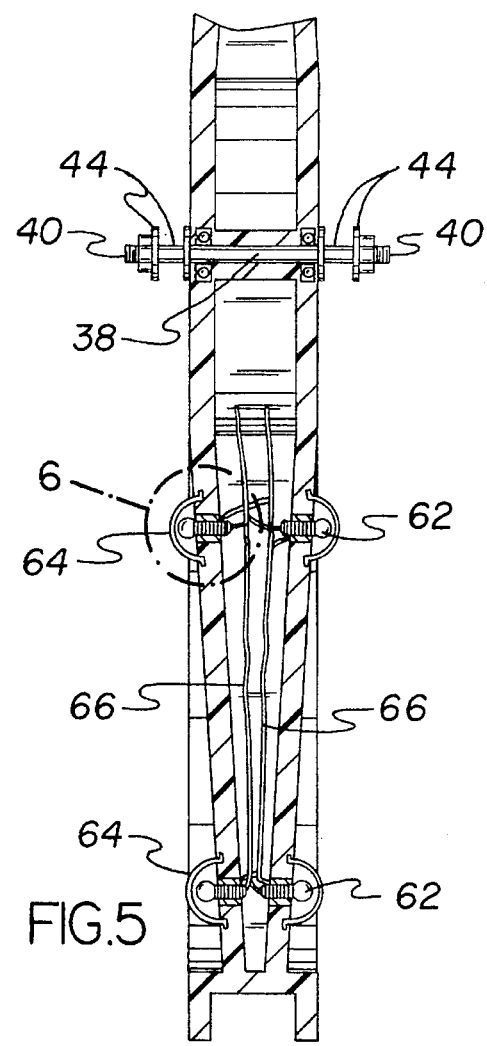
FIG. 5 is a cross sectional view of the apparatus taken along section line 5—5 of FIG. 4.

Four equidistantly spaced spokes 18 extend radially from the hub 14. Each spoke has an outboard end 56 which is affixed to the inner surface of the rim 12. Each spoke has sidewalls 60 which are formed contiguously with the sidewalls of the hub 14. The distance between the sidewalls of each spoke is greater adjacent to the hub 14 than at its outboard end. In cross section the spokes are formed in a V-shape, as shown in FIG. 5. The spacing and configuration of the spokes provide reinforcing support to the rim thereby helping to prevent warping and denting. Note FIGS. 2, 3 and 5.

Figure 6:
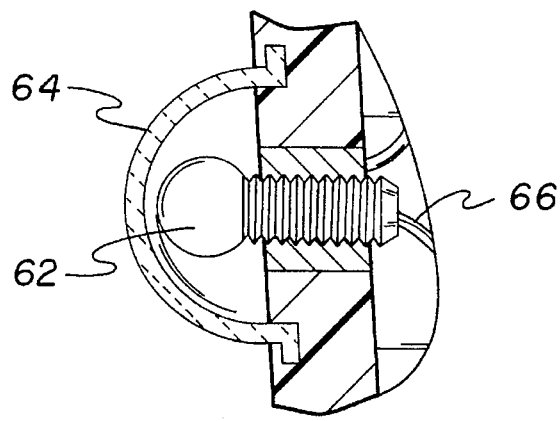
FIG. 6 is a cross sectional view of the apparatus taken along section line 6 of FIG. 5.

A light bulb 62 is positioned through each sidewall of each rim 12 adjacent to the hub 14 and outboard end of each spoke. Each bulb includes a spherical portion and a threaded portion. The spherical portion extends through the sidewall and is illuminated in the operative orientation. A generally semispherical shaped light bulb cover 64 is coupled around each light bulb. In varying embodiments of the apparatus the light bulbs and covers are fabricated in different colors. Note FIGS. 5 and 6.

A plurality of electrically conductive wires 66 operatively couple each light bulb to the switch and battery terminal coupling devices 50. To illuminate the bulbs the user simply slides the switch into the "on" orientation. The illuminated lights bulbs provide enhanced visibility of both a bicycle and its rider, particularly at night. The present invention provides an outstanding safety feature for alerting approaching motorists. The apparatus also helps to deter assault and theft against users since a perpetrator would be more likely to select a victim in a poorly lighted setting. Note FIGS. 4, 5 and 7.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A bicycle wheel with battery powered safety lights adapted for use in association with a bicycle having a fork with two free ends, the apparatus comprising:

a rim formed in a cylindrical configuration with an inner surface and an outer surface, the outer surface including two end edges with ledges extending radially outward therefrom; and a hub formed in a cylindrical configuration and positioned centrally within the rim, an axle extending through the axis of the hub, the axle having two ends each being rotatably couplable to a free end of a bicycle fork, a plurality of spokes extending radially from the hub and being affixed to the inner surface of the rim, the spokes having sidewalls with a plurality of light bulbs positioned therethrough, a first sidewall of the hub including a switch and a hinged door to permit access to a battery compartment, the battery compartment being operatively coupled to the switch and light bulbs, in an operative orientation the lights bulbs being illuminated to provide enhanced visibility of a bicycle.

2. The bicycle wheel with battery powered safety lights as set forth in claim 1 and further including:

an inflatable bicycle tire positioned around the outer surface of the perimeter of the rim.

3. The bicycle wheel with battery powered safety lights as set forth in claim 1 and further including:

two washer assemblies each comprising inboard and outboard washers separated by a central member, each washer assembly being coupled to a free end of the axle whereby each inboard washer abuts a side wall of the hub, each central member adapted to receive the semicircular slot of a bicycle fork thereby permitting circular rotation thereabout.

4. The bicycle wheel with battery powered safety lights as set forth in claim 1 wherein the apparatus includes four spokes each having an outboard end, each spoke having sidewalls formed contiguously with the sidewalls of the hub, the distance between the sidewalls of each spoke being greater adjacent to the hub than at each outboard end.

5. A new and improved bicycle wheel with battery powered safety lights adapted for use in association with a bicycle having a fork with two free ends, each free end including a semicircular slot, the apparatus comprising, in combination:

a rim formed in a cylindrical configuration with two open ends and a perimeter, the perimeter of the rim having an inner surface and an outer surface, the outer surface of the perimeter of the rim including two end edges with ledges extending radially outward therefrom, an inflatable bicycle tire being positioned around the outer surface of the perimeter of the rim between the ledges;

a hub formed in a generally cylindrical configuration and having an essentially hollow interior, the hub having a rounded outer wall and two planar circular side walls, the hub being positioned centrally within the rim with said rounded outer wall facing the inner surface of the rim, the axis of an hub including an aperture extending therethrough, an axle with two free ends extending through the aperture in the hub, each free end extending beyond an adjacent sidewall of the hub and including external screw threads, two washer assemblies each comprising inboard and outboard washers separated by a central member, each washer assembly being threadedly coupled to a free end of the axle whereby each inboard washer abuts a side wall of the hub, each central member adapted to receive the semicircular slot of a bicycle fork thereby permitting circular rotation thereabout;

a first sidewall of the hub including a switch and two hinged doors to permit access within said interior, a battery compartment being positioned adjacent to each door, each battery compartment including battery terminal coupling devices, a plurality of electrically conductive wires operatively coupling each of the battery coupling devices to the switch, the switch being slidable to an on orientation allowing the flow of electrical current therethrough, the switch being slidable to an off orientation prohibiting electrical current flow therethrough; and four equidistantly spaced spokes extending radially from the hub, each spoke having an outboard end affixed to the inner surface of the rim, each spoke having sidewalls formed contiguously with the sidewalls of the hub, the distance between the sidewalls of each spoke being greater adjacent to the hub than at each outboard end, a light bulb being positioned through each sidewall of each rim adjacent to the hub and outboard end of each spoke, a generally semispherical shaped light bulb cover being coupled around each light bulb, a plurality of electrically conductive wires operatively coupling each light bulb to the switch and battery terminal coupling devices, in an operative orientation the lights bulbs being illuminated to provide enhanced visibility of a bicycle.

* * * * *